United States Patent Office 3,447,817
Patented June 3, 1969

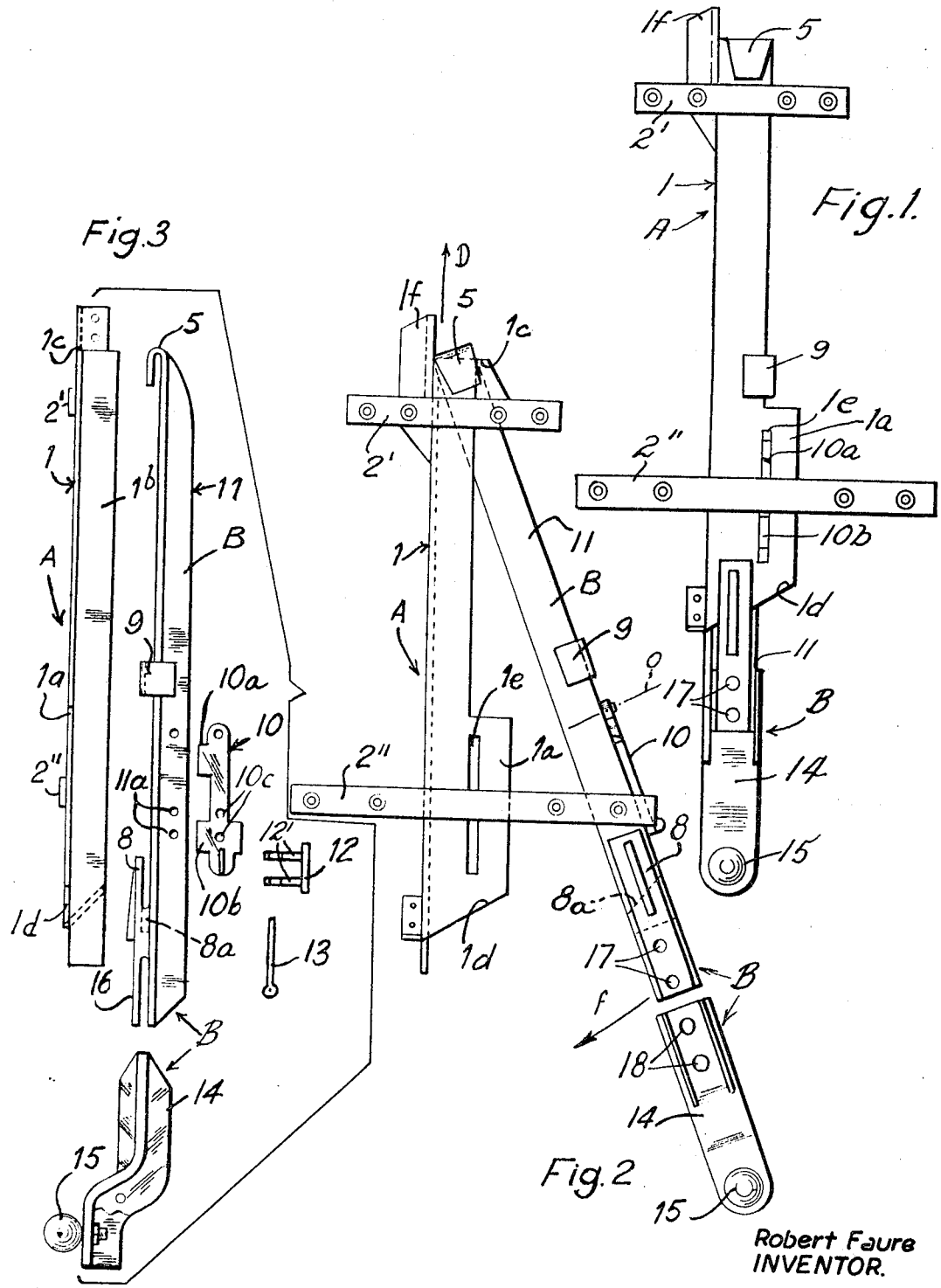

3,447,817
VEHICULAR ATTACHMENT FOR TRAILER HITCHES
Robert Faure, 5 Rue des Acacias, L'Haye-les-Roses, Val-de-Marne, France
Filed Apr. 27, 1967, Ser. No. 634,305
Claims priority, application France, May 5, 1966, 60,364
Int. Cl. B60d
U.S. Cl. 280—491         8 Claims

ABSTRACT OF THE DISCLOSURE

A tractor-borne attachment for a trailer hitch consists of two separable bar-shaped elements, i.e. a fixed element secured to the tractor and a detachable element carrying a swivel head, the two bars extending in the direction of travel when operatively interconnected. The fixed element has nonparallel front and rear edges engageable by respective lugs on the detachable element upon lateral movement of the latter, locking means being provided to prevent spontaneous disassembly of the two bars. The swivel head may be mounted on a separable extension of the detachable element.

---

This invention relates to a tractor-borne coupling attachment for trailer hitches.

An object of the invention is to provide an attachment of this type consisting of two separable elements so designed as to be readily assembled in a simple manner, without tools, while ensuring efficient and reliable performance.

Trailer couplings or hitches generally comprise two coacting units, namely: a swivel-joint support carried by the tractor vehicle and a coupling bar rigid with the trailer.

The swivel-joint support is secured as a rule by bolting to the rear longitudinal members of the chassis and body or to the floor of the vehicle trunk or boot when the engine is mounted at the front of the vehicle, or alternatively to the cradle of the engine if the latter is mounted in the rear.

By its inherent position the swivel-joint support has a configuration consistent with the type of vehicle with which it is to be associated, so as to correspond in shape to the trunk or boot, fuel tank and other obstacles it must clear.

Although swivel-joint supports are usually referred to as vehicular attachments they are generally fitted permanently on the vehicle, for the mounting and proper positioning thereof is inconvenient for the user.

In order to improve the appearance of these swivel-joint supports, of which one portion is visible at the rear of the vehicle, this portion is usually concealed by chromium-plated ornaments and caps.

The most satisfactory arrangement would obviously consist in having a swivel-joint support which can be emplaced when needed and can be removed at other times. Such an arrangement requires a mounting than can be very easily assembled and disassembled by any unskilled user.

A prior system of this character comprises a swivel-joint support made of two separable elements, namely an elongate first tube secured permanently to the underside of the body of the vehicle and not visible at the rear of the vehicle, and a ball-supporting second tube adapted to be introduced into the aforesaid first tube and to be fastened thereto by means of a cross pin.

However, this device was found to be of limited reliability. Thus:

The tube strength was appreciably impaired by the cross-pin holes;

Considering its relatively small diameter, this cross pin was fragile owing to the shearing stress to which it was subjected;

Eventually, permanent distortions made it frequently very difficult to fit and remove the inner tube into and from the fixed tube.

To remedy these inconveniences, the invention provides a coupling attachment of the aforescribed character consisting of two separable elements in the form of bars extending in the direction of travel, one bar being secured permanently to the vehicle, the other bar carrying the swivel-joint head or ball; these two bars have complementary end formations adapted to interfit upon a lateral relative motion of the bars from a generally parallel position of mutual separation, i.e. a motion generally transverse to the direction of pull of the vehicle.

According to a specific feature of this invention, the fixed element secured to the vehicle comprises a support conforming to the shape of the vehicle body and having two generally transverse horizontal edges at its ends, the detachable ball supporting element comprising two complementary formations or lugs adapted to engage these edges of the fixed element in longitudinal abutting relationship whereby both traction and compression stresses in the direction of travel of the vehicle will be absorbed by the assembly.

According to a preferred embodiment of this invention, one edge of the fixed bar is perpendicular to the direction of travel while the other edge is inclined to that direction in order to facilitate mutual assembling and disassembling of the elements with only small longitudinal clearance, the driving force during forward travel being transmitted through the first-mentioned edge so as not to give rise to any lateral stress component.

According to another specific feature of this invention, the pair of elements constituting my improved attachment are provided with complementary locking means adapted not only to prevent any uncoupling in the longitudinal direction but also to resist any transverse or oblique separating forces acting upon these elements.

Other features and advantages of this invention will appear as the following description proceeds with reference to the accompanying drawing illustrating diagrammatically by way of example the manner in which this invention may be carried into practice.

In the drawing:

FIG. 1 is a top view illustrating the tractor-borne coupling unit for a trailer hitch embodying my invention in assembled condition;

FIG. 2 is a top view similar to FIG. 1, showing the two elements of this unit during the first phase of the assembly thereof; and FIG. 3 is an exploded side-elevational view of the unit.

The vehicular attachment shown in the drawing includes two bar-shaped elements A and B which can be rigidly joined to each other by a simple relative movement in a direction generally perpendicular to their principal dimension, i.e. to the direction D of travel.

More specifically, the element A consists of an elongate support 1 of suitable cross-section comprising an upper flange of web 1a rigid with two cross members 2', 2" provided for securing the support 1 to the body or chassis of the tractor vehicle. Advantageously, this support 1 consists of an angle iron also having a flange 1b.

The ends 1c and 1d of the horizontal web 1a constitute a pair of generally transverse but nonparallel edges. Rear edge 1d is cut askew with respect to the longitudinal direction of element A; scant edge 1c extends at right angles to that direction. The other element B comprises a bar 11 with a rearwardly bent hook or lug 5 adapted to fit around the front edge 1c of element A and a forwardly pointing undercut lug 8 having an inner edge 8a inclined to the longitudinal dimension of bar 11 at the angle of inclination of the beveled end 1d of element A with reference to direction D.

It is clear that by placing the detached element B obliquely in relation to the fixed element A in the position shown in FIG. 2, so that the end 1c fits into the bent lug 5, a simple pivoting movement about this end 1c in the direction of arrow f will enable such a superposition of the two elements A and B that edges 1c and 1d will longitudinally bear upon the complementary formations 5 and 8 of element B. Therefore, any traction or compression stress applied to one or the other element in the longitudinal direction thereof will be ineffectual to uncouple these elements from each other.

To facilitate this coupling and to limit the relative pivotal movement of the elements, bar 11 of element B comprises a transversely bent lug 9 which forms an abutment for the flange 1b of bar 1. This bent lug 9 also acts both as a guide member during the interfitting and as a means for preventing any undesired vertical oscillation. A bracket 1f on the front end of bar 1 forms a stop for the hook 5.

The top flange 1a has a throughgoing longitudinal slot 1e, the cross members 2" extending across this slot; element B carries a latch member 10 pivoting about a horizontal axis o. This latch member 10 comprises two bosses 10a and 10b adapted, in the operative or locking position of this member, to enter said slot 1e on opposite sides of cross member 2", thereby straddling the latter. Latch member 10 has a pair of holes 10c registering with a pair of holes 11a formed in the vertical flange of bar 11, these pairs of holes being engageable by corresponding lock pins carried by a separate retaining plate 12.

When elements A and B have been brought into their mutual coupling shown in FIG. 1, latch 10 is received in slot 1e and pins 12' of plate 12 are inserted into the holes 10c and 11a to prevent disengagement of latch 10 from bar 1; a cotter pin 13 is thereafter slipped through aligned holes formed in the lock pins 12' of plate 12 to prevent any untimely removal of this plate.

It will be noted that the pins 12', like the cotter pin 13, are not subjected to any appreciable shearing stress.

Advantageously, the element B consists of two separate pieces, i.e. the bar 11 carrying the lugs 5, 8, 9 and an extension 14 carrying the ball or swivel head 15 of a universal joint. These two pieces 11 and 14 fit into each other by means of a slot coupling comprising a tongue 16 integral with lug 8, this tongue being engageable by a mating end portion of extension 14 whereupon the two pieces 11, 14 can be locked or fastened together by means of bolts or rivets passing through alignable holes 17, 18 thereon.

Although the present invention has been described with reference to a preferred embodiment, it is to be understood that modifications and variations may be resorted to without departing from the spirit and scope of the invention, as those skilled in the art will readily understand.

What I claim is:
1. A vehicular attachment for coupling a trailer to a tractor, comprising:
   a fixed element in the form of a first bar having fastening means for securing same to the rear of a tractor vehicle with its principal dimension lying in the direction of travel;
   a detachable element including a second bar parallel to and adjacent said first bar, one of said bars having generally transverse front and rear edges, the other of said bars having front and rear formations respectively engaging said front and rear edges in longitudinally abutting relationship therewith, said front and rear edges converging toward one side to permit disengagement of said bars by swinging said other of said bars toward said side about one of said edges;
   and coupling means mounted rearwardly on said detachable element.

2. An attachment as defined in claim 1 wherein said edges are on said first bar, said front edge being perpendicular to said principal dimension, said rear edge being inclined with reference to said principal dimension at an acute angle, said front and rear formations including a rearwardly bent front hook and a forwardly pointing undercut lug on said second bar, the undercut of said lug defining an inner edge including said acute angle with the longitudinal direction of said second bar.

3. An attachment as defined in claim 1, further comprising locking means for releasably securing said bars against transverse relative motion.

4. A vehicular attachment for coupling a trailer to a tractor, comprising:
   a fixed element in the form of a first bar having fastening means for securing base to the rear of a tractor vehicle with its principal dimension lying in the direction of travel;
   a detachable element including a second bar parallel to and adjacent said first bar, one of said bars having a substantially horizontal web with generally transverse front and rear edges, the other of said bars having front and rear formations respectively engaging said front and rear edges in longitudinally abutting relationship therewith, said front and rear edges converging toward one side to permit disengagement of said bars by swinging said other of said bars toward said side about one of said edges;
   and coupling means mounted rearwardly on said detachable element.

5. An attachment as defined in claim 4 wherein said web is provided on said first bar, said front and rear formations including a rearwardly bent front hook and a forwardly pointing undercut lug on said second bar.

6. An attachment as defined in claim 4 wherein said web is provided with a longitudinal slot, further comprising a latch member on the bar bearing said formations engageable in said slot for releasably securing said bars against relative lateral motion.

7. An attachment as defined in claim 4 wherein said second bar is provided with a separable extension, said coupling means being a swivel head mounted on said extension.

8. A vehicular attachment for coupling a trailer to a tractor, comprising:
   affixed element in the form of a first bar having fastening means for securing same to the rear of a tractor vehicle with its principal dimension lying in the direction of travel;
   a detachable element including a second bar parallel to and adjacent said first bar, said bars having complementary pairs of front and rear formations in engagement with one another and disengageable by a relative motion of said bars generally transverse to said principal dimension, said formations including a lug on said second bar integral with a rearwardly pointing tongue;

and coupling means mounted rearwardly on said detachable element, said second bar having a separable rear extension fitted onto said tongue and bearing said coupling means.

References Cited

UNITED STATES PATENTS 2,622,892  12/1952  Lowman _____ 280—495

FOREIGN PATENTS 710,594  6/1931  France.

LEO FRIAGLIA, *Primary Examiner.*

U.S. Cl. X.R.

280—495